Apr. 3, 1923. 1,450,847
C. M. GEIGER
COMBINED RADIATOR, STEAM COOKER AND WARMING OVEN
Filed Oct. 26, 1921
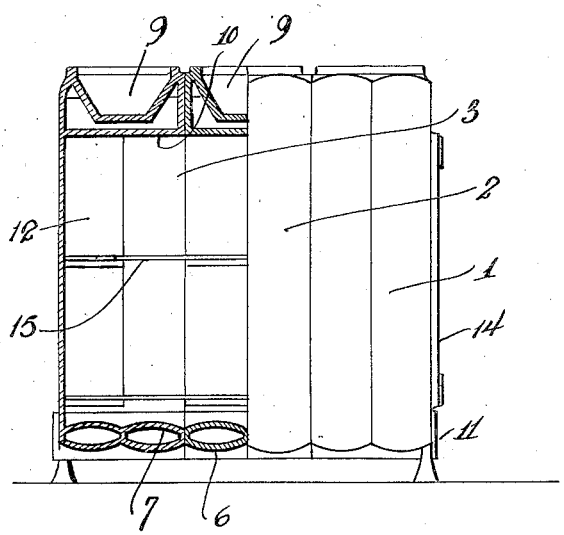
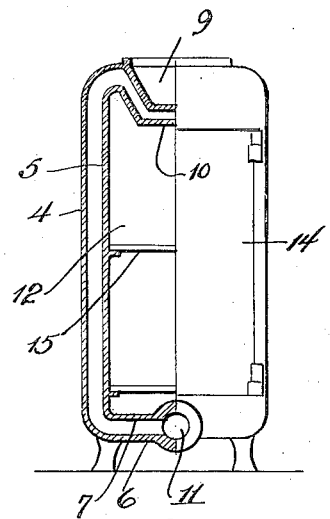
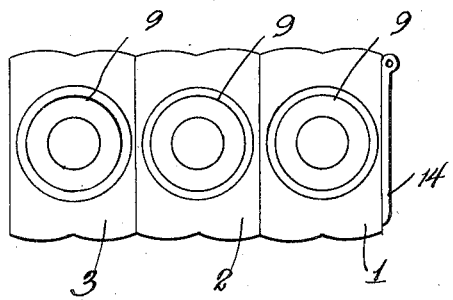
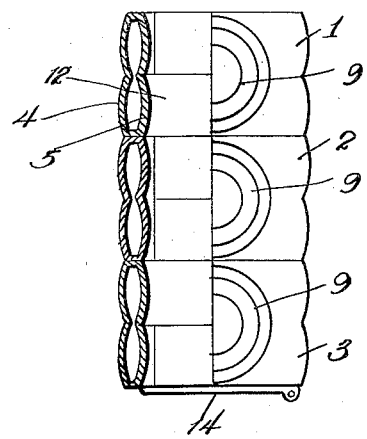
INVENTOR
Charles M. Geiger Patented Apr. 3, 1923.

1,450,847

UNITED STATES PATENT OFFICE.

CHARLES M. GEIGER, OF DENVER, COLORADO.

COMBINED RADIATOR, STEAM COOKER, AND WARMING OVEN.

Application filed October 26, 1921. Serial No. 510,626.

*To all whom it may concern:*

Be it known that I, CHARLES M. GEIGER, a citizen of the United States, residing at Denver, in the county of Denver and State of Colorado, have invented certain new and useful Improvements in Combined Radiators, Steam Cookers, and Warming Ovens, of which the following is a specification.

This invention relates to improvements in radiators and more particularly to a combination radiator, steam cooker and warming oven.

The primary object of the invention is to provide a sectional radiator having an arrangement of parts which will permit the radiator to be used as a steam cooker, while the interior of the radiator sections may also be used as a warming oven, to keep food while the radiator is also being used as a heating unit for a room.

Other objects of the invention will appear upon consideration of the following detail description and accompanying drawings, wherein:—

Figure 1 is a side elevation partly in section showing the device constructed in accordance with this invention, Figure 2 is an end elevation partly in section showing the door at the end of the device, Figure 3 is a plan view, and Figure 4 is a cross section taken in a horizontal plane.

Referring to the drawing by numerals, the radiator consists of any number of sections 1, 2 and 3. The sections are identical in formation and consequently a description of one will suffice. The sections are provided with double side walls 4, and 5 and double bottom walls 6 and 7. A top receptacle is provided in each section which is substantially frustoconical in formation and is arranged in inverted position the bottom of the receptacle, forming the upper wall of the double walls which enclose the top of the section. The lower wall 10 directly beneath the receptacle 9 separates the upper water passage-way from the interior of the section. In this manner, the water or steam passing through the opening 11 from the pipe, will permit a circulation of hot water or steam around the hollow interior 12 of the section, so that heat will be radiated from the outer wall and will cause the heat to be distributed to the interior wall for forming a warming oven therein. The receptacle 9 is used to receive a close fitting cooking pan or utensil of porcelain or aluminum for the purpose of cooking food and it will be obvious that when the cooking utensil is placed in the receptacle, sufficient heat will be generated to cook the contents of the vessel. The end wall of the endmost section is provided with a hinged door 14 which may be swung open to permit the food to be placed within the warming oven whereby it may be kept warm and a horizontal shelf or partition 15 is utilized to provide a place upon which the receptacles containing the food may be placed.

It will be understood that the radiator sections may be together in any number so that the radiator may be made as long or as short as desired.

Minor changes may be made in the details of construction without departing from the spirit of the invention or the scope of the claim hereunto appended.

What is claimed is:—

The combination of a plurality of radiator sections adapted to be assembled together and having hollow interiors in open communication, one of the end sections being provided with an end wall, a horizontal shelf arranged on the interior of the sections, the said sections being provided with double side walls, double bottom walls, and double upper walls, a door hingedly connected to the opposite end section to cooperate with the opposite end wall, side walls, bottom walls, and top walls to form an oven, and the uppermost wall of the double upper walls being provided with an inverted frustoconical receptacle adapted to receive a cooking utensil, whereby the utensil may be heated from the heat generated between the double upper walls.

In testimony whereof, I have affixed my signature in the presence of two witnesses.

CHARLES M. GEIGER.

Witnesses:
JOHN J. BRADLEY,
ALICE M. T. BRADLEY.